(12) United States Patent
Lee et al.

(10) Patent No.: US 8,684,287 B2
(45) Date of Patent: Apr. 1, 2014

(54) COFFEE GRINDER CAPABLE OF REMOVING PARCHMENTS OF COFFEE BEANS AND METHOD OF REMOVING THE PARCHMENTS

(75) Inventors: Yuan-Hung Lee, Taichung (TW); Bing-Yang Lee, Taichung (TW)

(73) Assignee: Bing-Yang Lee, Taichung (TW)

( * ) Notice: Subject to any disclaimer, the term of this patent is extended or adjusted under 35 U.S.C. 154(b) by 376 days.

(21) Appl. No.: 13/223,622

(22) Filed: Sep. 1, 2011

(65) Prior Publication Data

US 2013/0056567 A1    Mar. 7, 2013

(51) Int. Cl.
*A47J 42/38*    (2006.01)

(52) U.S. Cl.
USPC ............ 241/19; 241/78; 241/79.1; 241/100; 241/162

(58) Field of Classification Search
USPC ................ 241/19, 30, 100, 79.1, 162, 78
See application file for complete search history.

(56) References Cited

U.S. PATENT DOCUMENTS

| | | | | |
|---|---|---|---|---|
| 3,459,558 | A * | 8/1969 | Farmer et al. | 426/454 |
| 7,201,098 | B2 * | 4/2007 | Wang | 99/286 |
| 2010/0018405 | A1 * | 1/2010 | Duvall | 99/289 R |

* cited by examiner

*Primary Examiner* — Mark Rosenbaum
(74) *Attorney, Agent, or Firm* — Tracy M. Heims; Apex Juris, PLLC (57) ABSTRACT

A coffee grinder includes a machine base, in which a crushing unit, a separating unit, and a grinding unit are provided. The machine base has an inlet and an outlet, and the crushing unit is under the inlet to crush coffee beans into parchments and beans. The separating unit has a rotary member and a collection container that the rotary member provides an air flow to send the parchments to the collection container. The grinding unit is between the crushing unit and the outlet to grind the beans from the separating unit and send the ground beans to the outlet. The present invention crush the coffee beans to separate the parchments and the beans, and the parchments are removed by the separating unit. Next, the beans will be ground.

17 Claims, 11 Drawing Sheets

COFFEE GRINDER CAPABLE OF REMOVING PARCHMENTS OF COFFEE BEANS AND METHOD OF REMOVING THE PARCHMENTS

BACKGROUND OF THE INVENTION

1. Field of the Invention

The present invention relates generally to a coffee maker, and more particularly to a coffee grinder capable of removing parchments of coffee beans, and a method of removing the parchments.

2. Description of the Related Art

More and more people drink coffee every day. There are several facts that affect the flavor of coffee, including coffee beans species, roasting, grinding, water temperature, way of pouring water, and time of brewing etc. Some of the facts are controllable, such as time of brewing, and water temperature; and some of them are not, such as coffee species. The coffee beans contain tannin, and tannin will change into light yellow powder after processing and is easy to melt in water. Tannin will dissolve into acid after boiling which will affect the flavor of the coffee. Tannin is presented in the parchment of the coffee bean, and, therefore, we can make a good coffee if we remove the parchments from the bean.

The parchment is an endocarp behind the skin of the coffee bean. The conventional coffee grinder only grinds the coffee beans, and, however, the parchment is mixed in the ground coffee and can't be separated. The coffee made by such ground coffee tastes sour. If we can grind the coffee beans and no parchment is left in the ground coffee, it can make a good coffee.

SUMMARY OF THE INVENTION

The primary objective of the present invention is to provide a method, which may automatically and quickly remove the parchment from coffee bean.

The secondary objective of the present invention is to provide a small size coffee grinder, which integrates separating and grinding of the coffee beans in one unit to grind the separated beans and collect the parchment in another place.

According to the primary objective of the present invention, a method of removing parchments from coffee beans and grinding beans, includes the steps of: sending coffee beans into a machine base via an inlet; crushing the coffee beans into parchments and beans; separating the parchments and the beans, wherein the heavy beans are sent to a vertical path by gravity, and the light parchments are sent to a side path, which is not parallel to the vertical path; and grinding the beans, and sending the ground beans out of the machine base via an outlet.

The present invention further provides a coffee grinder includes a machine base, in which a crushing unit, a separating unit, and a grinding unit are provided. The machine base has an inlet and an outlet, and the crushing unit is under the inlet to crush coffee beans into parchments and beans. The separating unit has a rotary member and a collection container that the rotary member provides an air flow to send the parchments to the collection container. The grinding unit is between the crushing unit and the outlet to grind the beans from the separating unit and send the ground beans to the outlet.

In an embodiment, the grinding unit is under the crushing unit, and a path is formed between the crushing unit and the grinding unit, and the separating unit is connected to a middle section of the path. A three-way pipe has a top end connected to the crushing unit, a bottom end, which is opposite to the top end, connected to the grinding unit, and a side end connected to the separating unit. The path is formed in the three-way pipe between the top end and the bottom end. The rotary member of the separating unit is a fan between the collection container and the side end of the three-way pipe.

In an embodiment, the coffee grinder of the present invention further includes a driving unit having an axle through the path. The crushing unit has a cutter disk and cutter which the cutter is connected to the axle, and the grinding unit has a cutter disk and cutter which the cutter is connected to the axle.

In an embodiment, the coffee grinder of the present invention further includes an adjusting unit having an adjusting disk, which has a hole at a center and a thread on a sidewall of the hole, and a thread on the cutter disk of the grinding unit to be meshed with the thread of the adjusting disk. The adjusting unit further has a rotary disk, which has a portion extending out of the machine base via an opening on the machine base, to be connected to the adjusting disk and turned along with the adjusting disk in the same axis of rotation. In order to position the rotary disk, the present invention further includes a positioning unit. The adjusting unit further has a cover to be connected to the adjusting disk and turned along with the adjusting disk in the same axis of rotation, and the positioning unit includes a plurality of indentations on an outer side of the three-way pipe and a ball on an inner side of the cover of the adjusting unit to engage the indentation when the rotary disk is turned.

In an embodiment, the coffee grinder of the present invention further includes a housing provided in the machine between the grinding unit and the outlet. The housing has an upper chamber, on a sidewall of which an opening is provided to communicate the upper chamber with the outlet, and a down chamber to receive a gear of the driving unit therein. The gear of the driving unit is connected to the axle, and the driving unit further has a motor connected to the gear to drive the axle to turn through the gear. The driving unit further has a motor connected to the gear to drive the axle to turn through the gear. In order to send out the ground beans, a wheel is provided in the upper chamber of the housing and connected to the axle, and the wheel is under the cutter of the grinding unit.

DETAILED DESCRIPTION OF THE INVENTION

Figure 1:
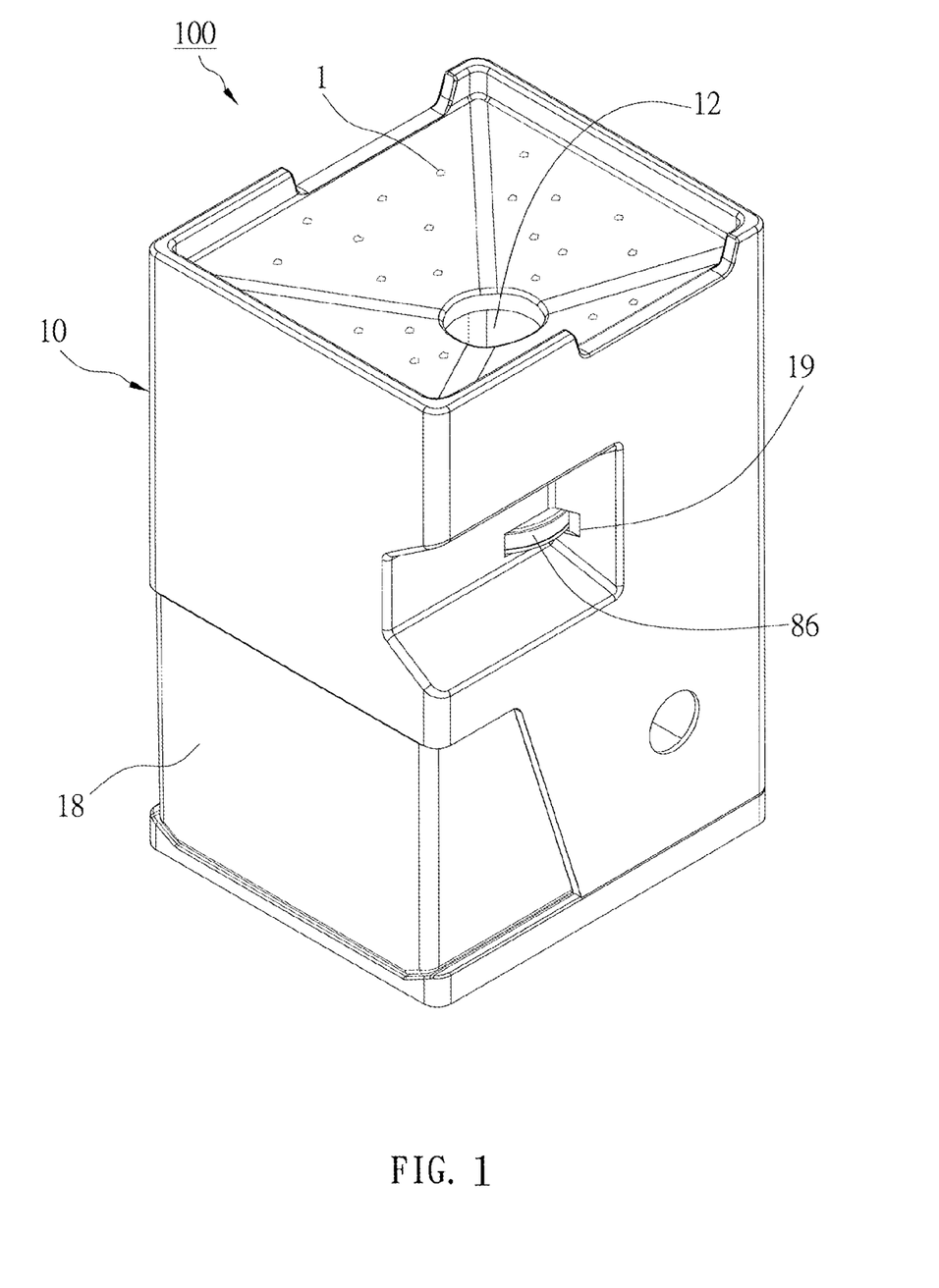
FIG. 1 is a perspective view of a preferred embodiment of the present invention, showing the inlet of the coffee grinder.
Figure 2:
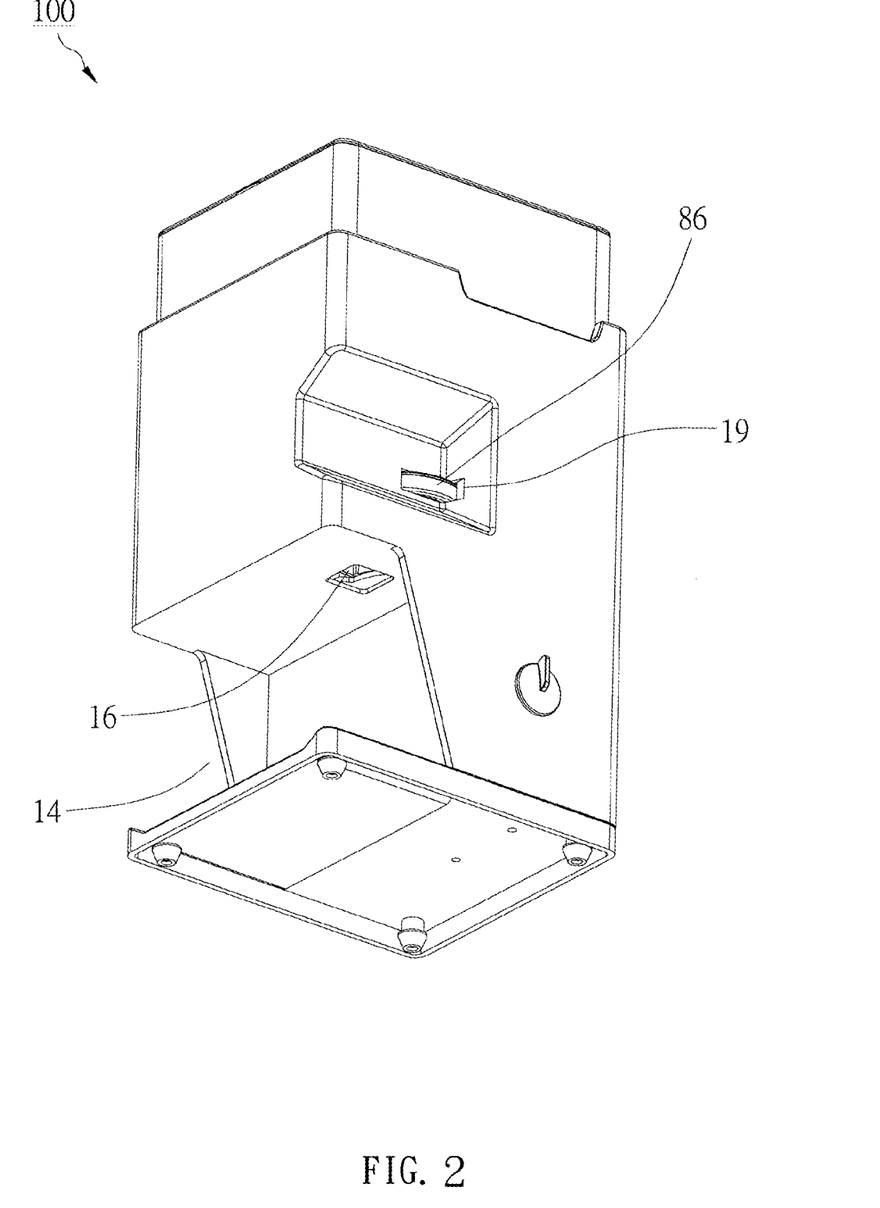
FIG. 2 is another sectional view of the preferred embodiment of the present invention, showing the outlet of the coffee grinder.
Figure 3:
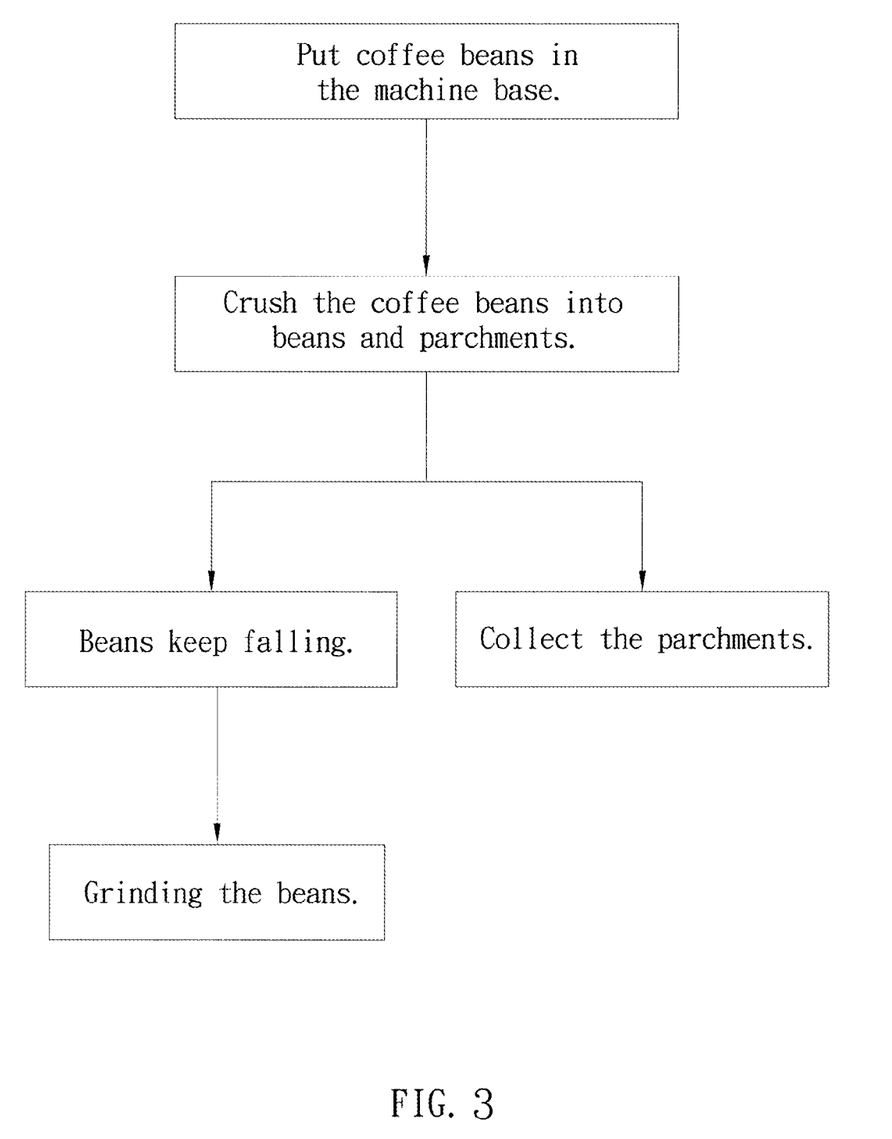
FIG. 3 is a flow chart of the preferred embodiment of the present invention, showing the steps of removing the parchments and grinding beans.
Figure 4:
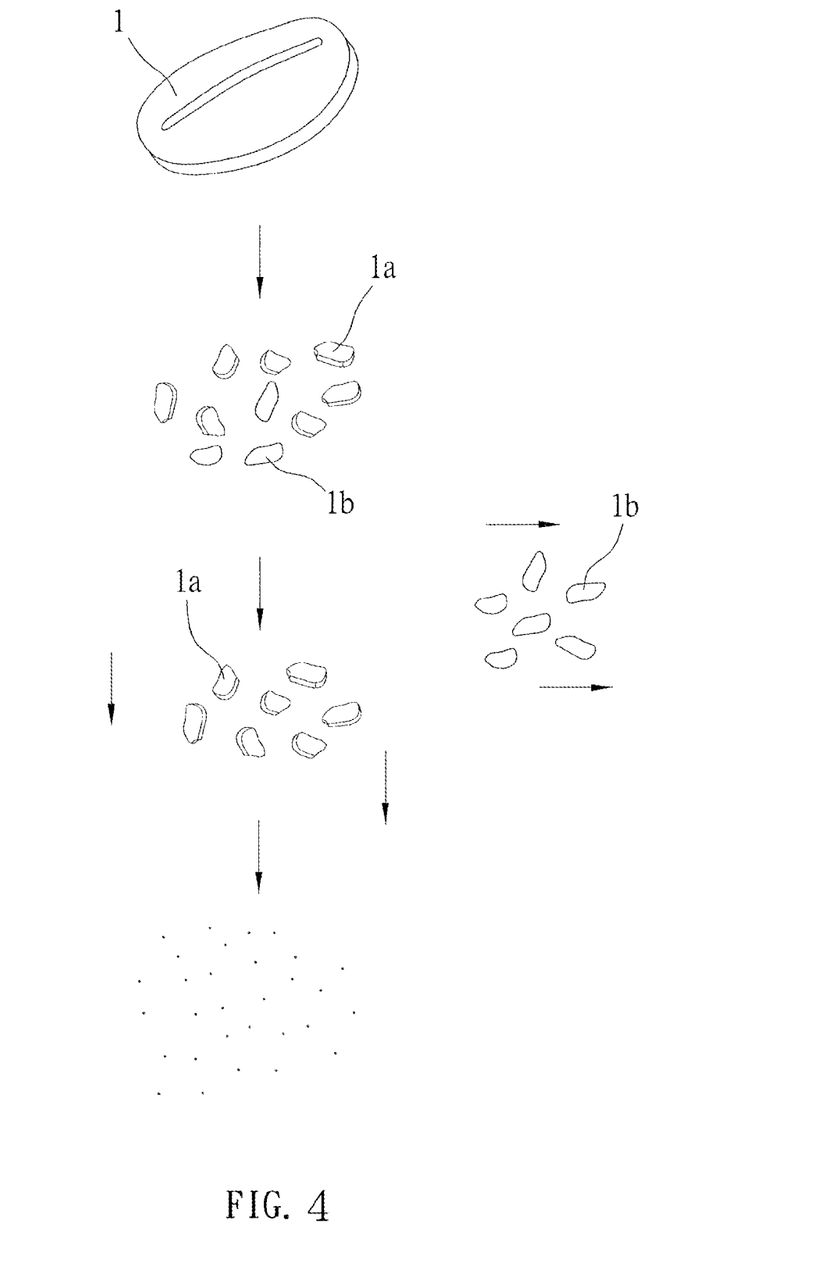
FIG. 4 is a sketch diagram, showing the parchments being removed from the coffee beans and the coffee beans being ground.

FIG. 1 and FIG. 2 show a coffee grinder 100 of the preferred embodiments of the present invention. FIG. 3 is a flow chart, showing how the coffee grinder 100 the preferred embodiment of the present invention removes the parchments and grinds the beans. FIG. 4 shows the parchments being from the coffee beans and the coffee beans being ground. The structure and the operation of the coffee grinder 100 of the preferred embodiments of the present invention will be described hereunder.

Figure 5:
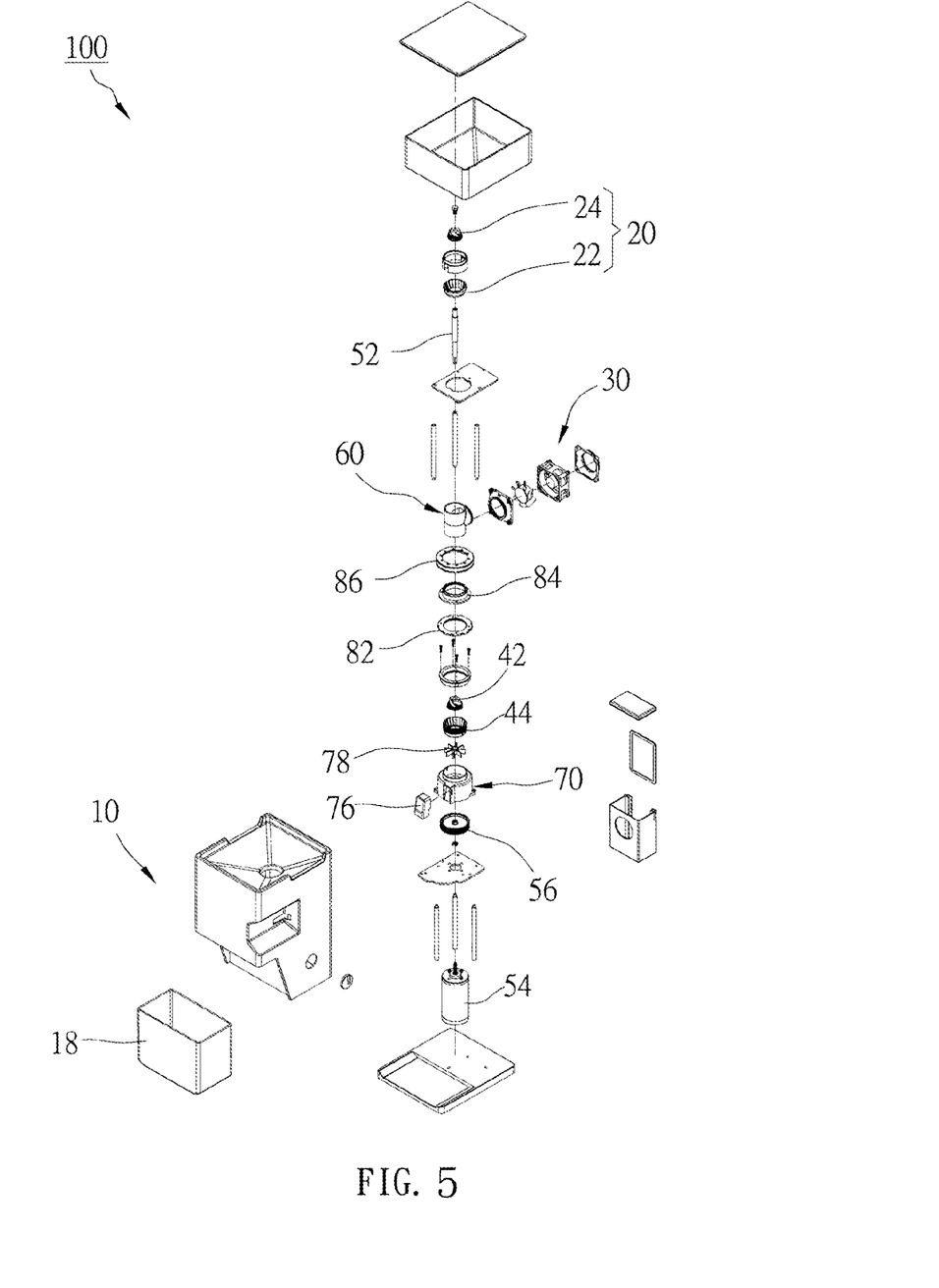
FIG. 5 is an exploded view of the preferred embodiment of the present invention, showing the elements of the coffee grinder.
Figure 6:
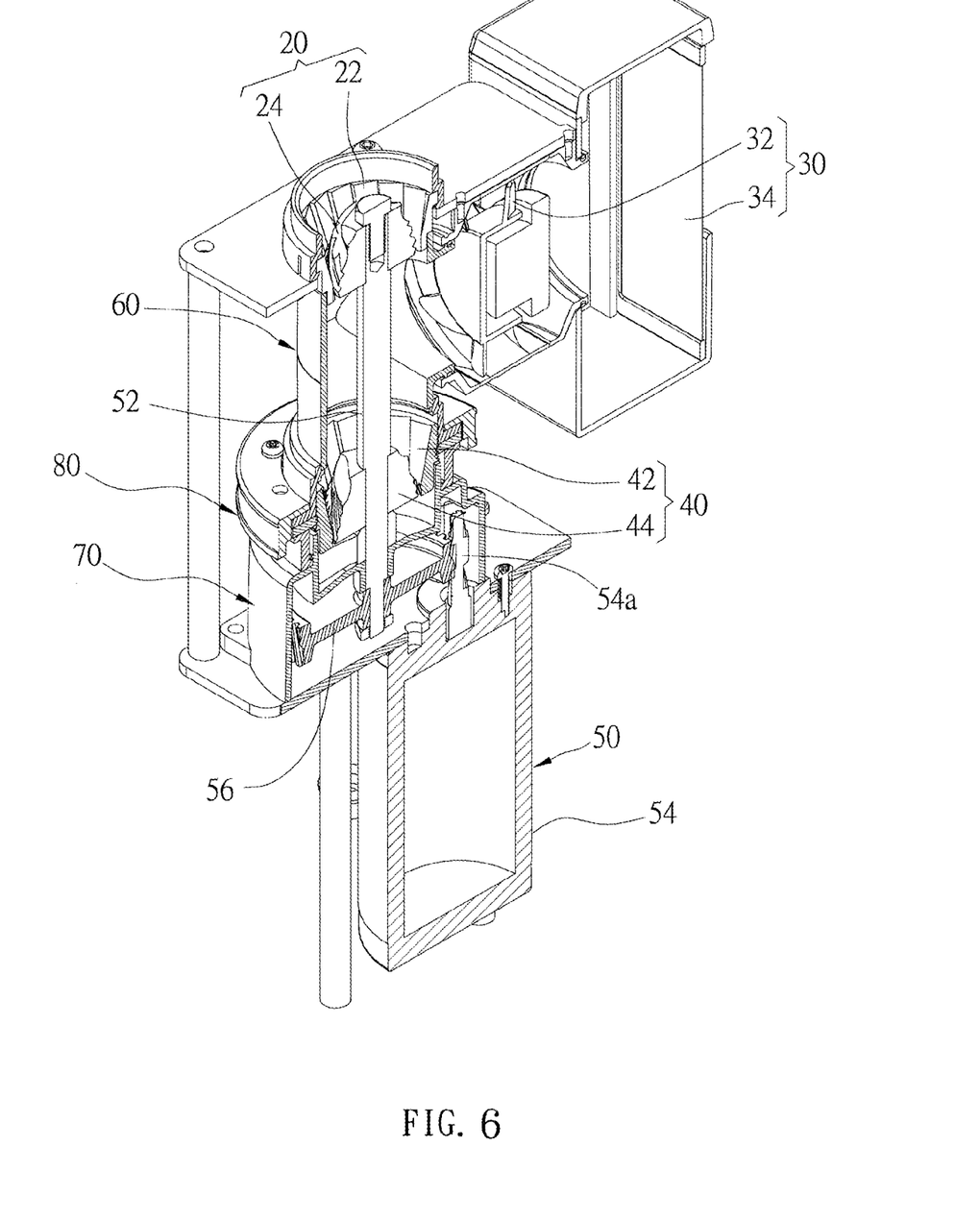
FIG. 6 is a sectional view of the preferred embodiment of the present invention, showing the crushing unit, the separating unit, and the grinding unit.
Figure 7:
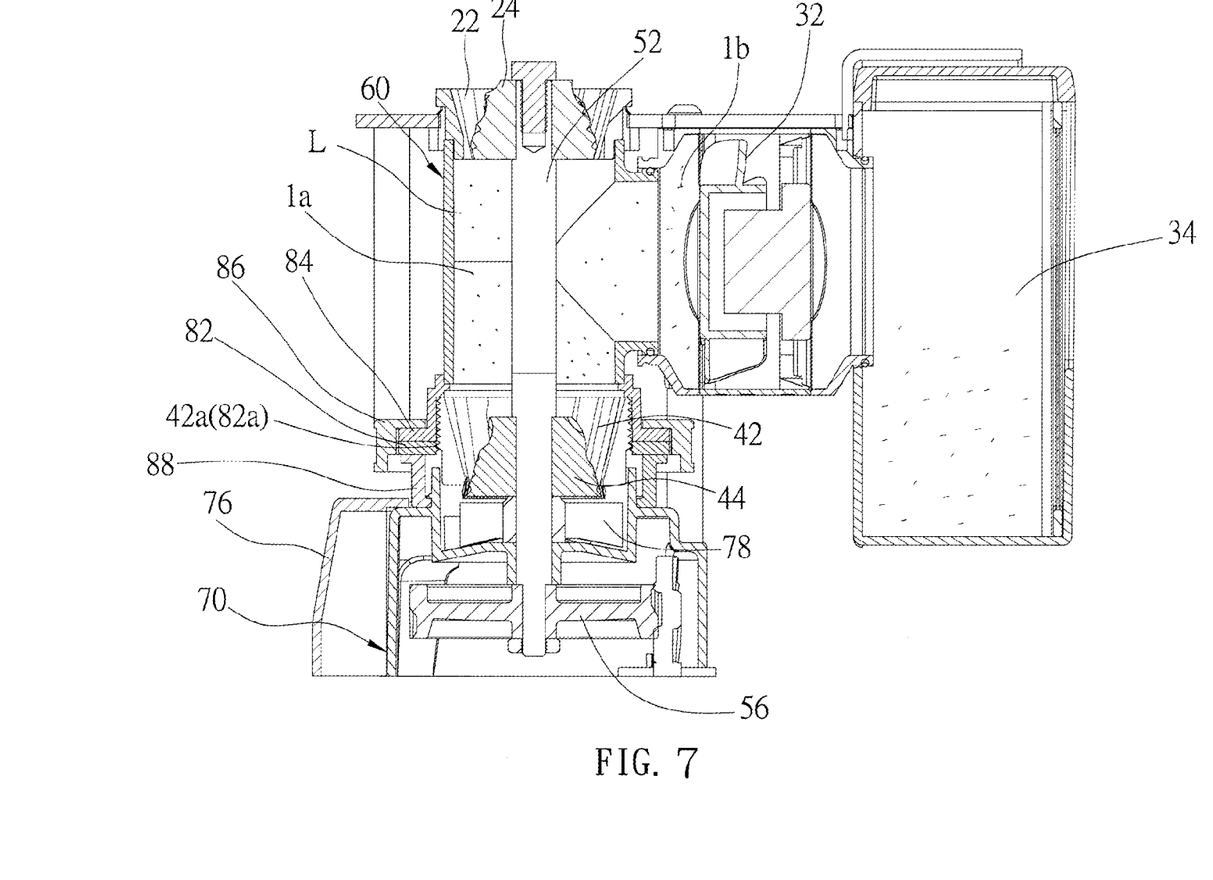
FIG. 7 is another sectional view of the preferred embodiment of the present invention, showing the crushing unit, the separating unit, and the grinding unit.

As shown in FIGS. from FIG. 5 to FIG. 7, the coffee grinder 100 has a machine base 10, a crushing unit 20, a separating unit 30, a grinding unit 40, a driving unit 50, a three-way pipe 60, and a housing 70.

The machine base 10 has an inlet 12 at a top thereof that coffee beans 1 enter the machine base 10 via the inlet 12. The machine base 10 has a recess 14 at a front side and an outlet 16 on a top sidewall of the recess 14. A container 18 is received in the recess 14 of the machine base 10 that the ground coffee drop into the container 18 via the outlet 16, and the container 18 may be drawn out from for use.

Figure 8:
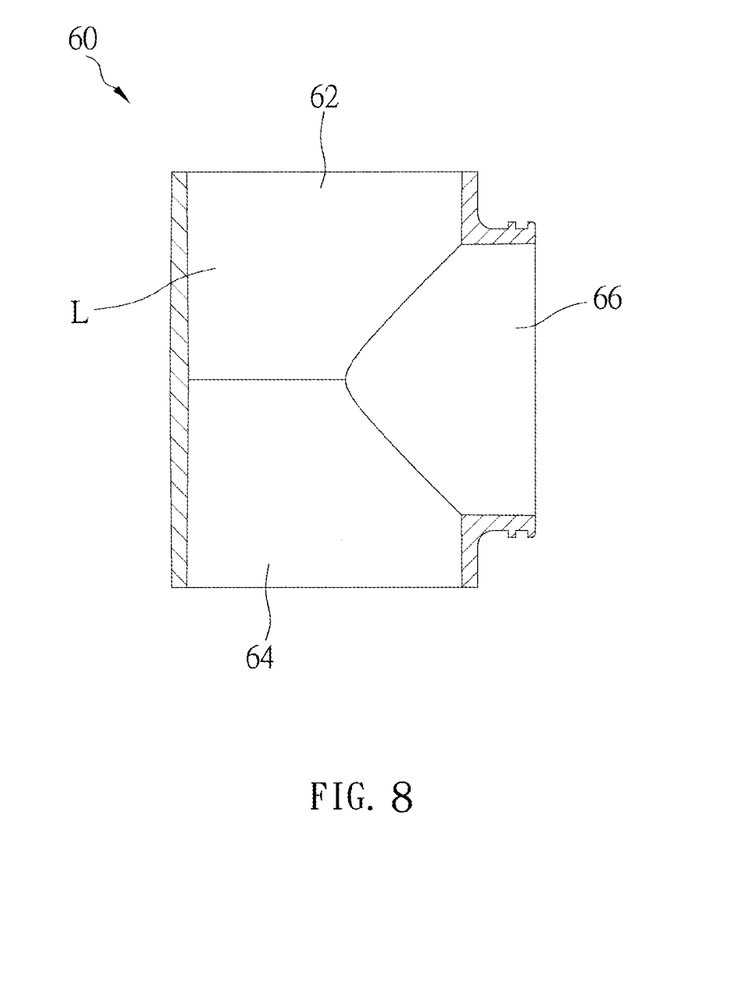
FIG. 8 is a sectional view of the preferred embodiment of the present invention, showing the three-way pipe.

The crushing unit 20 is provided in the machine base 10 and under the inlet 12. The grinding unit 40 is right under the crushing unit 20. The three-way pipe 60 is provided between the crushing unit 20 and the grinding unit 40. As shown in FIG. 8, a top end 62 of the three-way pipe 60 is connected to the crushing unit 20, a bottom end 64, opposite to the top end 62, is connected to the grinding unit 40, and a side end 66 is connected to the separating unit 30. In the three-way pipe 60 has a vertical path L between the top end 62 and the bottom end 64 and a side path communicating the vertical path L and the side end 66. Because the crushing unit 20 is right above the grinding unit 40, it may reduce the size of the machine base 10 to attract the consumer.

The crushing unit 20 includes a cutter disk 22 and a cuter 24 to crush the coffee beans 1 into beans 1a and parchments 1b. The grinding unit 40 includes a cutter disk 42 and a cuter 44 to grind the beans 1a. A gap between the cutter disk 22 and the cuter 24 of the crushing unit 20 is greater than a gap between the cutter disk 42 and the cuter 44 of the grinding unit 40 that the crushing unit 20 separates the beans 1a and the parchments 1b, and the grinding unit 40 may grind the beans 1a.

The driving unit 50 includes an axle 52 though the path L of the three-way pipe 60. The axle 52 is connected to the cutter 24 of the crushing unit 20 and the cuter 44 of the grinding unit 40 respectively. The driving unit 50 further includes a motor 54 with a spindle 54 connected to a gear 56 of the axle 52 to drive the cutters 24, 44 for synchronous rotation. Furthermore, the cutter 24 crushes the coffee beans 1 into the beans 1a, and, in the same time, crushes the parchments 1b which covers the beans 1a into small pieces, as shown in FIG. 4. The separated beans 1a and pieces of parchments 1b fall down in the path L of the three-way pipe 60 because of gravity.

The separating unit 30, which is between the crushing unit 20 and the grinding unit 40, includes a rotary member, which is a fan 32 in the present invention, and a collection container 34. The fan 32 is between the side end 66 of the three-way pipe 60 and the collection container 34 to provide an air flow to suck the pieces of parchments 1b, which are very light, in the vertical path L into the side path and send them to the collection container 34 via the side end 66. It is noted that the fan 32 can't suck the big and heavy beans 1a that the beans 1a will continuously fall down in the path L to the grinding unit 40. The beans 1a will keep falling down after being ground in the grinding unit 40, as shown in FIG. 4.

Figure 9:
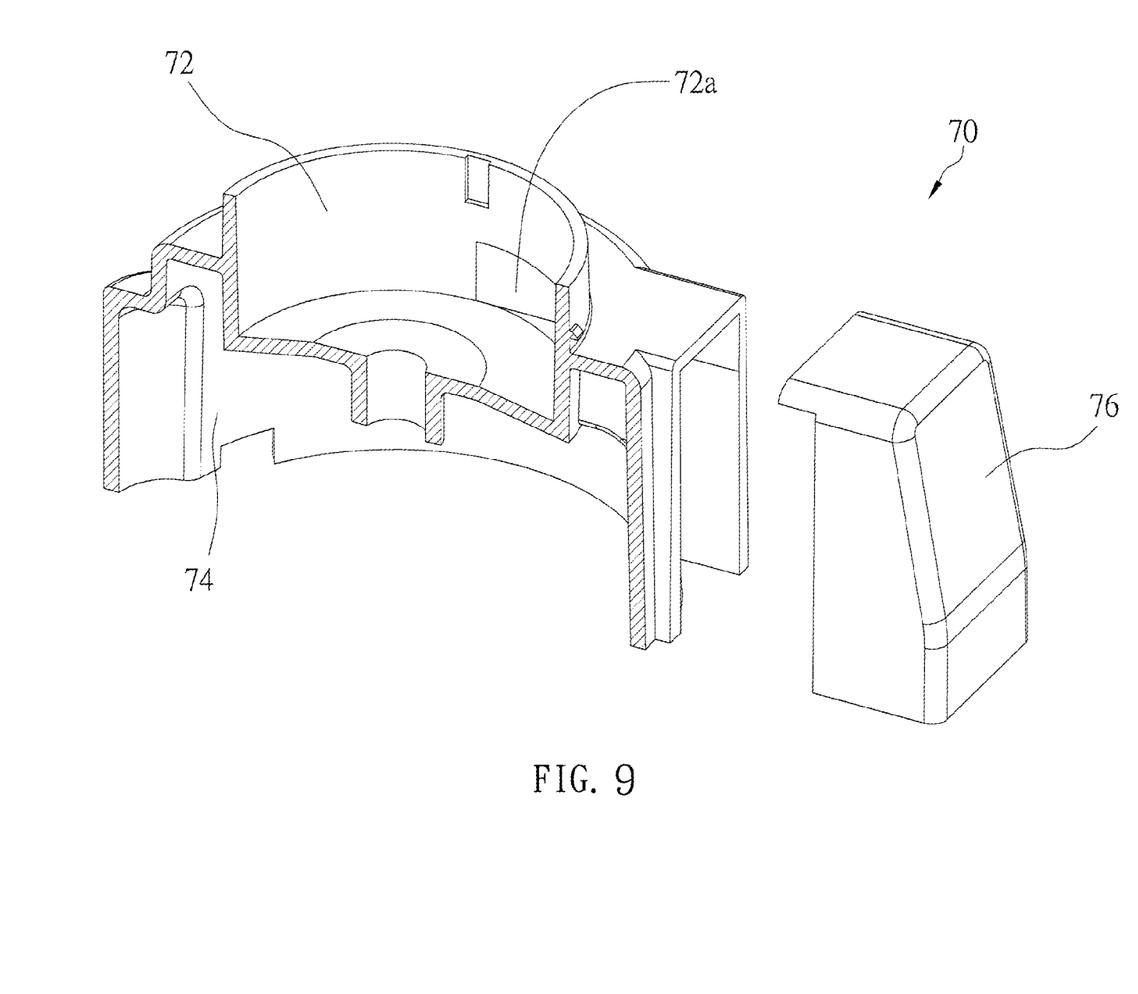
FIG. 9 is a sectional view of the preferred embodiment of the present invention, showing the housing.

As shown in FIG. 9, the housing 70, which is provided between the grinding unit 40 and the driving unit 50, has an upper chamber 72 and a down chamber 74 therein, and on a sidewall of the upper chamber 72 is provided with an opening 72a. A cover 76 is provided on an outer side of the up chamber 72 to cover the opening 72a and communicate the upper chamber with the outlet 16. A wheel 78 is connected to the axle 52. The wheel 78 is received in the upper chamber 72 and right under the cuter 44 of the grinding unit 40. The axle 52 drives the wheel 78 to turn that the wheel 78 may change the path of the ground beans 1a and send them to the opening 72a, and finally the ground beans 1a will come out through the outlet 16. The gear 56 is received in the down chamber 74 to be isolated from the ground beans 1a.

The coffee grinder 1 of the present invention and the method of removing the parchments and grind the beans are described as above. The present invention may automatically separate the beans 1a and the parchments 1b of the coffee beans 1 in a fast way, and, furthermore, it integrates the crushing unit 20, the separating unit 30, and the grinding unit 40, and sends the beans 1a to be processed by gravity, and separates the parchments 1b by siphonic power that the coffee powder in the container 18 may make a good coffee.

Figure 10:
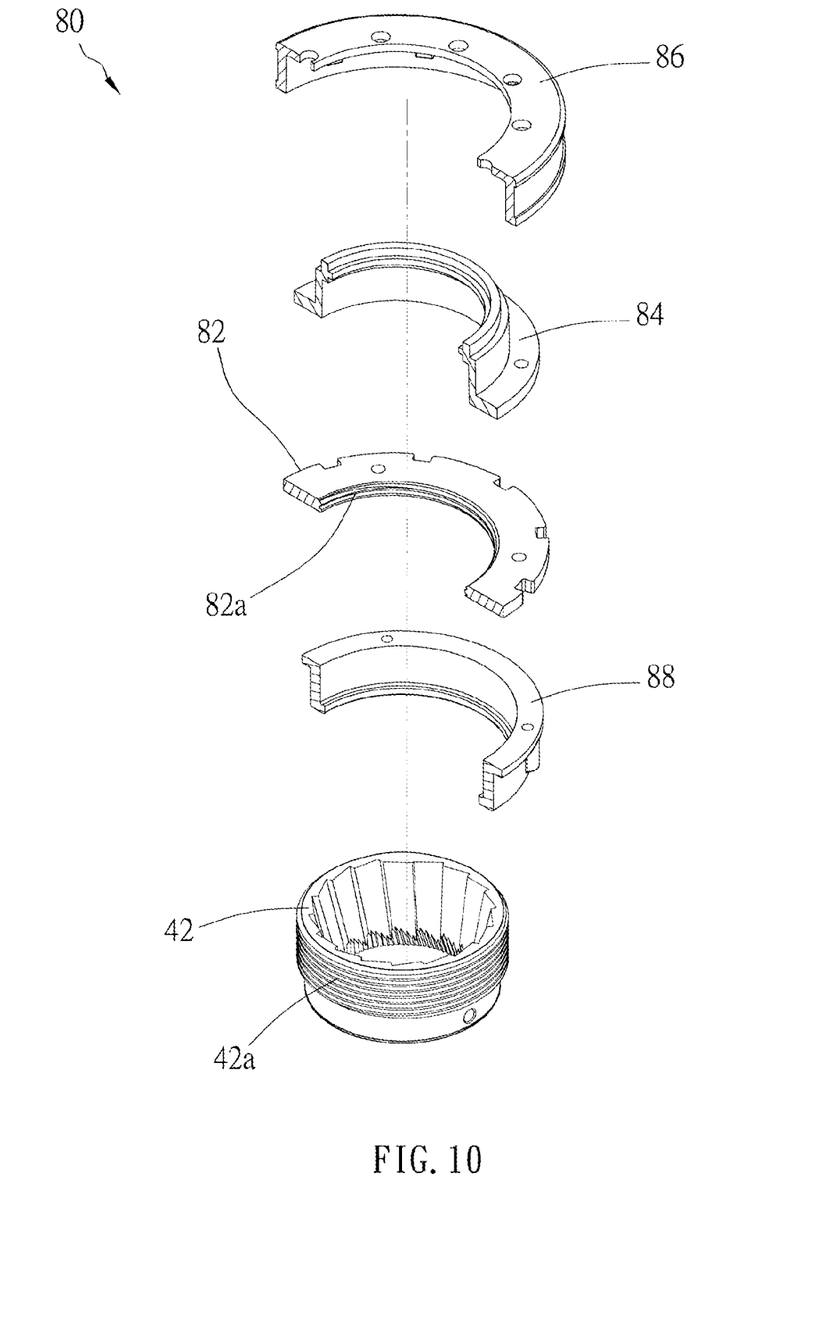
FIG. 10 is a sectional view of the preferred embodiment of the present invention, showing the adjusting unit and the cuter disk.

The coffee grinder 100 of the present invention may control the coffee powder's size. As shown in FIG. 10, the coffee grinder 100 further includes an adjusting unit 80, which includes an adjusting disk 82 to be driven to turn. The adjusting disk 82 has a hole at a center and a thread 82a on a sidewall of the hole. The cutter disk 42 of the grinding unit 40 is received in the hole of the adjusting disk 82, and has a thread 42a to be meshed with the thread 82a of the adjusting disk 82. The adjusting unit 80 further includes a cover 84, a rotary disk 86, and a base disk 88. The adjusting disk 82, the cover 84, and the rotary disk 86 are installed in the base disk 88 in sequence to be turned in the same axis of rotation. A top of the cover 84 is connected to the bottom end 64 of the three-way pipe 60, and the rotary disk 86 covers the adjusting disk 82. A part of the rotary disk 86 extends out of the machine base 10 via an opening 19 that user may turn the rotary disk 86 to move the cutter disk 42. As a result, the gap between the cutter disk 42 and the cutter 44 may be changed by turning the rotary disk 86.

Figure 11:
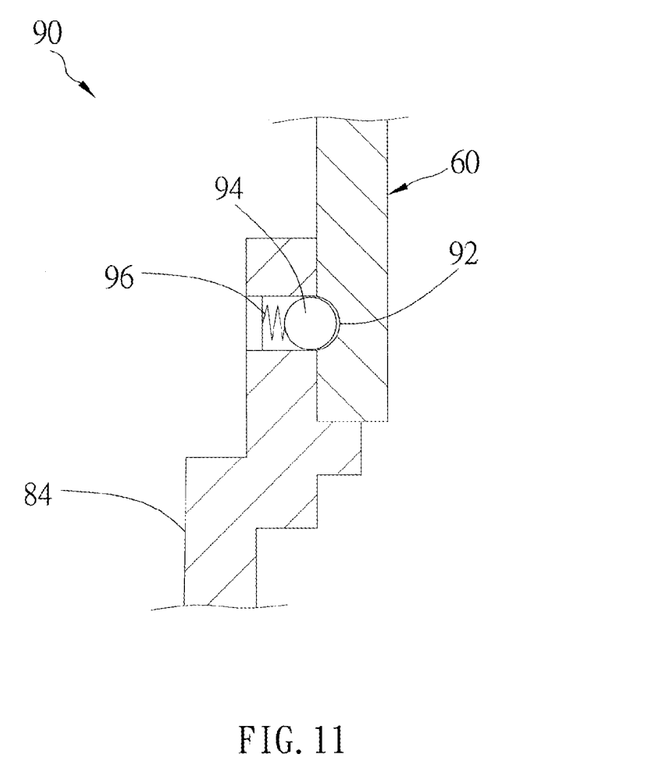
FIG. 11 is a sectional view of the preferred embodiment of the present invention, showing the positioning unit.

In order to position the cutter disk 41 after adjustment, the coffee grinder 100 of the present invention further provides a positioning unit 90. As shown in FIG. 11, the positioning unit 90 includes several indentations 92 on an outer side of the three-way pipe 60, a ball 94 on an inner side of the cover 84, and a spring 96 urging the ball toward the three-way pipe 60. The ball 94 may engage the indentation 92 when one turns the rotary disk 86 that the cutter disk 42 may be held at the position and will not be moved by vibration or other unexpected force to keep the gap between the cutter disk 42 and the cutter 44 after adjustment.

The description above is a few preferred embodiments of the present invention. These equivalences of the present invention are still in the scope of claim construction of the present invention.

What is claimed is:

1. A coffee grinder, comprising:

a machine base having an inlet and an outlet;

a crushing unit provided in the machine base and under the inlet to crush coffee beans into parchments and beans;

a separating unit, which is provided in the machine base, having a rotary member and a collection container, wherein the rotary member provides an air flow to send the parchments to the collection container; and a grinding unit provided in the machine base between the crushing unit and the outlet to grind the beans from the separating unit and send the ground beans to the outlet.

2. The coffee grinder as defined in claim 1, wherein the grinding unit is under the crushing unit, and a path is formed between the crushing unit and the grinding unit, and the separating unit is connected to a middle section of the path.

3. The coffee grinder as defined in claim 2, further comprising a driving unit having an axle through the path, wherein the crushing unit has a cutter disk and cutter which the cutter is connected to the axle, and the grinding unit has a cutter disk and cutter which the cutter is connected to the axle.

4. The coffee grinder as defined in claim 3, wherein further comprising an adjusting unit having an adjusting disk, which has a hole at a center and a thread on a sidewall of the hole, and a thread on the cutter disk of the grinding unit to be meshed with the thread of the adjusting disk.

5. The coffee grinder as defined in claim 4, wherein the adjusting unit further has a rotary disk, which has a portion extending out of the machine base via an opening on the machine base, to be connected to the adjusting disk and turned along with the adjusting disk in the same axis of rotation.

6. The coffee grinder as defined in claim 4, further comprising a three-way pipe having a top end connected to the crushing unit, a bottom end, which is opposite to the top end, connected to the grinding unit, and a side end connected to the separating unit, and the path is formed in the three-way pipe between the top end and the bottom end.

7. The coffee grinder as defined in claim 6, further comprising a housing, which is provided in the machine between the grinding unit and the outlet, having an upper chamber, on a sidewall of which an opening is provided to communicate the upper chamber with the outlet, and a down chamber to receive a gear of the driving unit therein, wherein the gear of the driving unit is connected to the axle, and the driving unit further has a motor connected to the gear to drive the axle to turn through the gear.

8. The coffee grinder as defined in claim 7, further comprising a wheel received in the upper chamber of the housing and connected to the axle, wherein the wheel is under the cutter of the grinding unit.

9. The coffee grinder as defined in claim 6, wherein the rotary member of the separating unit is a fan between the collection container and the side end of the three-way pipe.

10. The coffee grinder as defined in claim 6, further comprising a positioning unit, wherein the adjusting unit further has a cover to be connected to the adjusting disk and turned along with the adjusting disk in the same axis of rotation, and the positioning unit includes a plurality of indentations on an outer side of the three-way pipe and a ball on an inner side of the cover of the adjusting unit to engage the indentation when the rotary disk is turned.

11. A method of removing parchments from coffee beans and grinding beans, comprising the steps of:

sending coffee beans into a machine base via an inlet;

crushing the coffee beans into parchments and beans;

separating the parchments and the beans, wherein the heavy beans are sent to a vertical path by gravity, and the light parchments are sent to a side path, which is not parallel to the vertical path; and grinding the beans, and sending the ground beans out of the machine base via an outlet.

12. The method as defined in claim 11, wherein the coffee beans are crushed by a pair of a cutter disk and a cutter.

13. The method as defined in claim 12, wherein the beans are ground by another pair of a cutter disk and a cutter.

14. The method as defined in claim 13, wherein both of the cutters are connected to an axle to be turned synchronously.

15. The method as defined in claim 14, further comprising the step of moving the cutter disk for grinding the beans to change a gap between the cutter disk and the cutter.

16. The method as defined in claim 11, wherein the parchments are sent to the side path by an air flow.

17. The method as defined in claim 16, wherein the air flow is provided by a fan.

\* \* \* \* \*